(12) United States Patent
Akuzawa et al.

(10) Patent No.: US 9,882,435 B2
(45) Date of Patent: Jan. 30, 2018

(54) RESONANT TYPE HIGH FREQUENCY POWER SUPPLY DEVICE AND SWITCHING CIRCUIT FOR RESONANT TYPE HIGH FREQUENCY POWER SUPPLY DEVICE

(71) Applicant: Mitsubishi Electric Engineering Company, Limited, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 15/027,154

(22) PCT Filed: Oct. 31, 2013

(86) PCT No.: PCT/JP2013/079548
§ 371 (c)(1),
(2) Date: Apr. 4, 2016

(87) PCT Pub. No.: WO2015/063919
PCT Pub. Date: May 7, 2015

(65) Prior Publication Data
US 2016/0254700 A1    Sep. 1, 2016

(51) Int. Cl.
*H02M 1/08* (2006.01)
*H02M 1/36* (2007.01)
(Continued)

(52) U.S. Cl.
CPC .............. *H02J 50/12* (2016.02); *H02J 50/20* (2016.02); *H02M 7/48* (2013.01); *H02J 50/05* (2016.02);
(Continued)

(58) Field of Classification Search
CPC . H02J 50/20; H02J 50/12; H02J 50/23; Y02B 70/1441; Y02B 70/1491;
(Continued)

(56) References Cited

U.S. PATENT DOCUMENTS 4,607,323 A * 8/1986 Sokal .................... H03F 3/2176
                                                              330/10
5,416,387 A * 5/1995 Cuk ....................... H05B 41/28
                                                            315/209 R
(Continued)

FOREIGN PATENT DOCUMENTS

JP          61-295875 A       12/1986
JP          2006-353049       12/2006
(Continued)

OTHER PUBLICATIONS

International Search Report dated Jan. 28, 2014 in PCT/JP2013/079548 Filed Oct. 31, 2013.
(Continued)

*Primary Examiner* — Gustavo Rosario Benitez
(74) *Attorney, Agent, or Firm* — Oblon, McClelland, Maier & Neustadt, L.L.P.

(57) ABSTRACT

A resonant type high frequency power supply device provided with a power semiconductor element that performs a switching operation, the power supply device including a second power semiconductor element at least one or more connected in parallel to the power semiconductor element to achieve optimization of parasitic capacitances of the power semiconductor element and the second power semiconductor element itself, and a high frequency pulse drive circuit that transmits a pulse-shaped voltage signal having a high frequency exceeding 2 MHz to the power semiconductor element and the second power semiconductor element to
(Continued)

drive the power semiconductor element and the second power semiconductor element.

16 Claims, 16 Drawing Sheets

(51) Int. Cl.
    *H02J 50/12*     (2016.01)
    *H02M 7/48*     (2007.01)
    *H02J 50/20*     (2016.01)
    *H02J 50/05*     (2016.01)

(52) U.S. Cl.
    CPC ............... *H02M 2007/4815* (2013.01); *H02M 2007/4818* (2013.01); *Y02B 70/1441* (2013.01)

(58) Field of Classification Search
    CPC ............... H02M 7/53832; H02M 7/48; H02M 2007/4818; H02M 3/155; H02M 3/337; H02M 2007/4815; H02M 7/533; H02M 7/537; H02M 2001/0058
    See application file for complete search history.

(56) References Cited

U.S. PATENT DOCUMENTS

| | | | |
|---|---|---|---|
| 2008/0204247 A1* | 8/2008 | Lian | G06K 7/0008 340/572.3 |
| 2010/0164295 A1 | 7/2010 | Ichikawa et al. | |
| 2010/0184371 A1* | 7/2010 | Cook | H02J 5/005 455/41.1 |
| 2011/0049997 A1 | 3/2011 | Urano | |
| 2013/0033240 A1* | 2/2013 | Ye | H02M 1/4225 323/211 |
| 2013/0049654 A1* | 2/2013 | Kure | B60L 3/003 318/400.2 |
| 2015/0032052 A1* | 1/2015 | Guardiani | A61N 1/3787 604/151 |
| 2015/0341087 A1* | 11/2015 | Moore | H04B 5/0031 455/77 |

FOREIGN PATENT DOCUMENTS

| | | |
|---|---|---|
| JP | 2010-154700 A | 7/2010 |
| JP | 2011-78299 A | 4/2011 |
| JP | 2013-27129 A | 2/2013 |
| WO | 2013/080285 A1 | 6/2013 |
| WO | 2013/133028 A1 | 9/2013 |

OTHER PUBLICATIONS

Office Action dated Feb. 10, 2015 in Japanese Patent Application No. 2014-558348 (with unedited computer-generated English translation).

Transistor Technology, Feb. 2005, Chapter 13 (2 pages).

\* cited by examiner

BACKGROUND ART

RESONANT TYPE HIGH FREQUENCY POWER SUPPLY DEVICE AND SWITCHING CIRCUIT FOR RESONANT TYPE HIGH FREQUENCY POWER SUPPLY DEVICE

TECHNICAL FIELD

The present invention relates to a resonant type high frequency power supply device and a switching circuit for the resonant type high frequency power supply device that perform power transmission at a high frequency.

BACKGROUND ART

In a conventional resonant type high frequency power supply device shown in FIG. 17, a timing of a resonant switching of a power semiconductor element Q1 is adjusted by a capacitance value of a capacitor C1 (for example, refer to nonpatent reference 1).

RELATED ART DOCUMENT

Nonpatent Reference

Nonpatent reference 1: Transistor Technology, February 2005, Chapter 13

SUMMARY OF THE INVENTION

Problems to be Solved by the Invention

In the conventional configuration disclosed by nonpatent reference 1, there is provided with a circuit configuration which the timing of the resonant switching of the power semiconductor element Q1 is adjusted by the capacitance value of the capacitor C1; thus, once the timing is adjusted, the timing cannot be adjusted during a subsequent operation. However, parasitic capacitances (Cds+Cgd) of the power semiconductor element Q1 vary during operation. In addition, an internal resistance exists in the capacitor C1. Therefore, the timing of the resonant switching is deviated due to a power loss by the internal resistance of the capacitor C1 and the variation of the parasitic capacitances (Cds+Cgd) during the operation of the power semiconductor element Q1 to thus increase a switching loss. As a result, there is a problem such that power consumption as a resonant type high frequency power supply device increases, which causes reduction in power conversion efficiency.

The present invention is made in order to solve the above-mentioned problems, and it is therefore an object of the present invention to provide a resonant type high frequency power supply device and a switching circuit for the resonant type high frequency power supply device that achieve high efficiency with low power consumption and that can operate at a high frequency exceeding 2 MHz by adjusting the timing of the resonant switching of the power semiconductor element without using the capacitor.

Means for Solving the Problems

In accordance with the present invention, there is provided a resonant type high frequency power supply device provided with a power semiconductor element that performs a switching operation, the power supply device including: a second power semiconductor element at least one or more connected in parallel to the power semiconductor element to achieve optimization of parasitic capacitances of the power semiconductor element and the second power semiconductor element itself; and a high frequency pulse drive circuit that transmits a pulse-shaped voltage signal having a high frequency exceeding 2 MHz to the power semiconductor element and the second power semiconductor element to drive the power element and the second power semiconductor element.

In accordance with the present invention, there is provided a resonant type high frequency power supply device provided with a power semiconductor element that performs a switching operation, the power supply device including: at least one diode or more connected in parallel to the power semiconductor element to achieve optimization of parasitic capacitances of the power semiconductor element and the diode itself; and a high frequency pulse drive circuit that transmits a pulse-shaped voltage signal having a high frequency exceeding 2 MHz to the power semiconductor element to drive the power semiconductor element.

Advantages of the Invention

Because the resonant type high frequency power supply device in accordance with the present invention is configured as above, the resonant type high frequency power supply device achieves high efficiency with low power consumption, and can operate at a high frequency exceeding 2 MHz by adjusting the timing of the resonant switching of the power semiconductor element without using a capacitor.

EMBODIMENTS OF THE INVENTION

Hereafter, the preferred embodiments of the present invention will be explained in detail with reference to the drawings.

Embodiment 1

Figure 1:
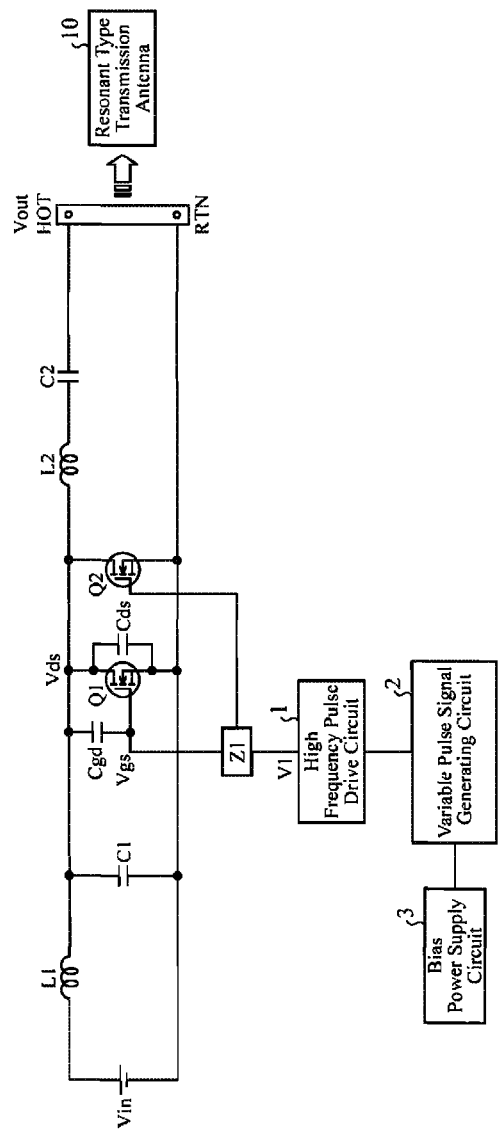
FIG. 1 is a diagram showing the configuration of a resonant type high frequency power supply device in accordance with Embodiment 1 of the present invention (in a case in which a power semiconductor element has a single configuration)

FIG. 1 is a diagram showing the configuration of a resonant type high frequency power supply device in accordance with Embodiment 1 of the present invention. In FIG. 1, a power semiconductor element Q1 represents a circuit in a case of a single configuration.

The resonant type high frequency power supply device is comprised of the power semiconductor element Q1, a power semiconductor element Q2 (a second power semiconductor element), a resonance circuit element (capacitors C1 and C2 and an inductor L2), an inductor L1, a high frequency pulse drive circuit 1, a variable pulse signal generating circuit 2 and a bias power supply circuit 3, as shown in FIG. 1. In addition, Cds and Cgd are parasitic capacitances, Z1 is an impedance of signal lines (wires, patterns on a board, etc.) between the high frequency pulse drive circuit 1 and each of a G terminal of the power semiconductor element Q1 and a G terminal of the power semiconductor element Q2. Additionally, a similar parasitic capacitance also exists in the power semiconductor element Q2, but it is not illustrated herein.

Further, a resonant type transmission antenna (a transmission antenna for power transmission) 10 is a resonant type antenna for power transmission having LC resonance characteristics (which is not limited only to a noncontact type one). This resonant type transmission antenna 10 can be of any of magnetic resonance type, electric resonance type, and electromagnetic induction type.

The power semiconductor element Q1 is a switching element that performs a switching operation in order to convert a direct voltage Vin, which is an input, into an alternating voltage. As the power semiconductor element Q1, not only an FET for RF but also an element, such as an Si-MOSFET, an SiC-MOSFET or a GaN-FET, can be used.

The power semiconductor element Q2 is a switching element having at least one element or more connected in parallel to the power semiconductor element Q1 so as to achieve optimization of the parasitic capacitances (Cds+Cgd) of the power semiconductor elements Q1 and Q2 themselves. As the power semiconductor element Q2, not only an FET for RF but also an element, such as an Si-MOSFET, an SiC-MOSFET or a GaN-FET, can be used.

Figure 2:
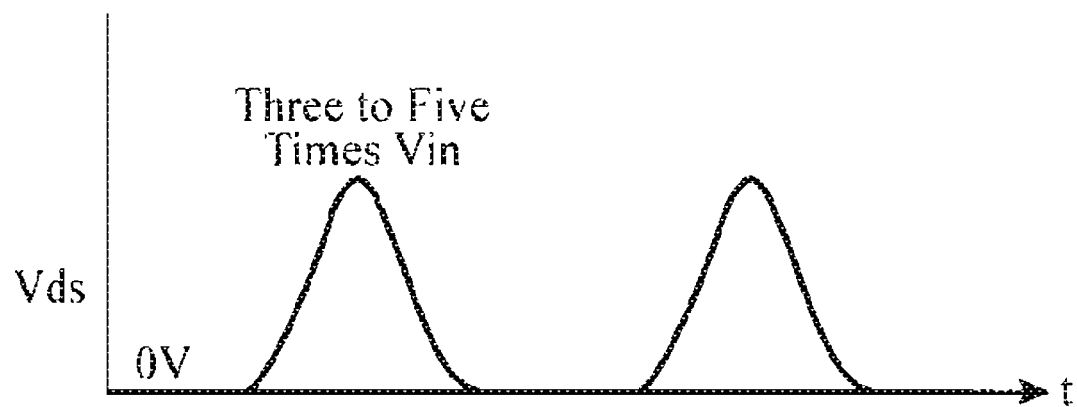
FIG. 2 is a diagram showing a Vds waveform according to the resonant type high frequency power supply device in accordance with Embodiment 1 of the present invention.

Additionally, an element such that a maximum value of a resonance voltage of Vds is three to five times the direct voltage Vin is selected for the power semiconductor elements Q1 and Q2, as shown in FIG. 2. Further, the optimization for that selection is achieved from the parasitic capacitances (Cds+Cgd) and a falling time of Vgs.

The resonance circuit element (the capacitors C1 and C2 and the inductor L2) is an element that causes the power semiconductor element Q1 to perform resonant switching in the switching operation. By using this resonance circuit element which consists of the capacitors C1 and C2 and the inductor L2, the resonance condition can be caused to match that of the resonant type transmission antenna 10. Additionally, the capacitor C1 is formed with a value that is smaller than capacitances of the power semiconductor elements Q1 and Q2 (a total of output capacitances Coss of the power semiconductor elements Q1 and Q2, etc.).

The inductor L1 works to hold the energy of the direct DC input voltage Vin temporarily, every time when the power semiconductor elements Q1 and Q2 perform the switching operations.

The high frequency pulse drive circuit 1 is a circuit that transmits a pulse-shaped voltage signal at a high frequency exceeding 2 MHz to each G terminal of the power semiconductor elements Q1 and Q2, to drive the power semiconductor elements Q1 and Q2. This high frequency pulse drive circuit 1 is a circuit which is provided a totem pole output circuit by using an FET or such a device to be able to perform a high-speed ON/OFF output.

The variable pulse signal generating circuit 2 is a circuit that transmits a pulse-shaped voltage signal having a high frequency exceeding 2 MHz, such as a logic signal, to the high frequency pulse drive circuit to drive the high frequency pulse drive circuit 1. This variable pulse signal generating circuit 2 is comprised of an oscillator for frequency setting and logic ICs such as an inverter and a flip-flop, and has functions such as a function of changing a pulse width and a function of outputting reverse pulses.

The bias power supply circuit 3 supplies driving power to both the variable pulse signal generating circuit 2 and the high frequency pulse drive circuit 1.

Next, the operation of the resonant type high frequency power supply device configured as above will be explained.

First, the input direct voltage Vin is applied to each D terminal of the power semiconductor elements Q1 and Q2 through the inductor L1. The power semiconductor elements Q1 and Q2 then convert the voltage into a positive voltage in an alternating form by performing the ON/OFF switching operation. At the time of this conversion operation, the inductor L1 works to hold the energy temporarily, thereby helping the conversion of the direct voltage to the alternating voltage.

In this embodiment, in the switching operation of the power semiconductor elements Q1 and Q2, in order to minimize a switching loss due to the product of an Ids current and a Vds voltage, the resonant switching condition is set to conduct a ZVS (zero voltage switching) to the resonance circuit device which consists of the capacitors C1, C2 and the inductor L2. By performing this resonant switching operation, the alternating voltage centered on an RTN voltage is outputted as an output voltage Vout.

The drivings of the power semiconductor elements Q1 and Q2 are performed by inputting the pulse-shaped voltage signal, which is outputted by the high frequency pulse drive circuit 1 that has received the arbitrary pulse-shaped voltage signal from the variable pulse signal generating circuit 2, to the G terminal of the power semiconductor element Q1 and the G terminal of the power semiconductor element Q2.

At that time, Vds of the D terminal of the power semiconductor element Q1 and the D terminal of the power semiconductor element Q2 exhibits a resonance waveform as shown in FIG. 2 from the parasitic capacitances (Cds+Cgd) and the resonant switching condition by the capacitors C1 and C2 and the inductor L2, and operates such that a peak voltage thereof is within a range of three to five times the direct voltage Vin. This enables the operations of the power semiconductor elements Q1 and Q2 with a small switching loss.

In addition, the driving frequency of the power semiconductor elements Q1 and Q2 serves as the operating frequency of the resonant type high frequency power supply device, and is determined by a setting made on the oscillator circuit disposed in the variable pulse signal generating circuit 2.

As mentioned above, the resonant type high frequency power supply device in accordance with Embodiment 1 is configured to comprise a second power semiconductor element at least one or more connected in parallel to the power semiconductor element Q1 to achieve the optimization of the parasitic capacitances (Cds+Cgd) of the power semiconductor elements Q1 and Q2 themselves; thus, when the timings of the resonant switching of the power semiconductor elements Q1 and Q2 are adjusted without causing the capacitor C1 to be variable, 90% or more high power conversion efficiency characteristics can be provided with low power consumption in the operation at a high frequency exceeding 2 MHz.

Figure 3:
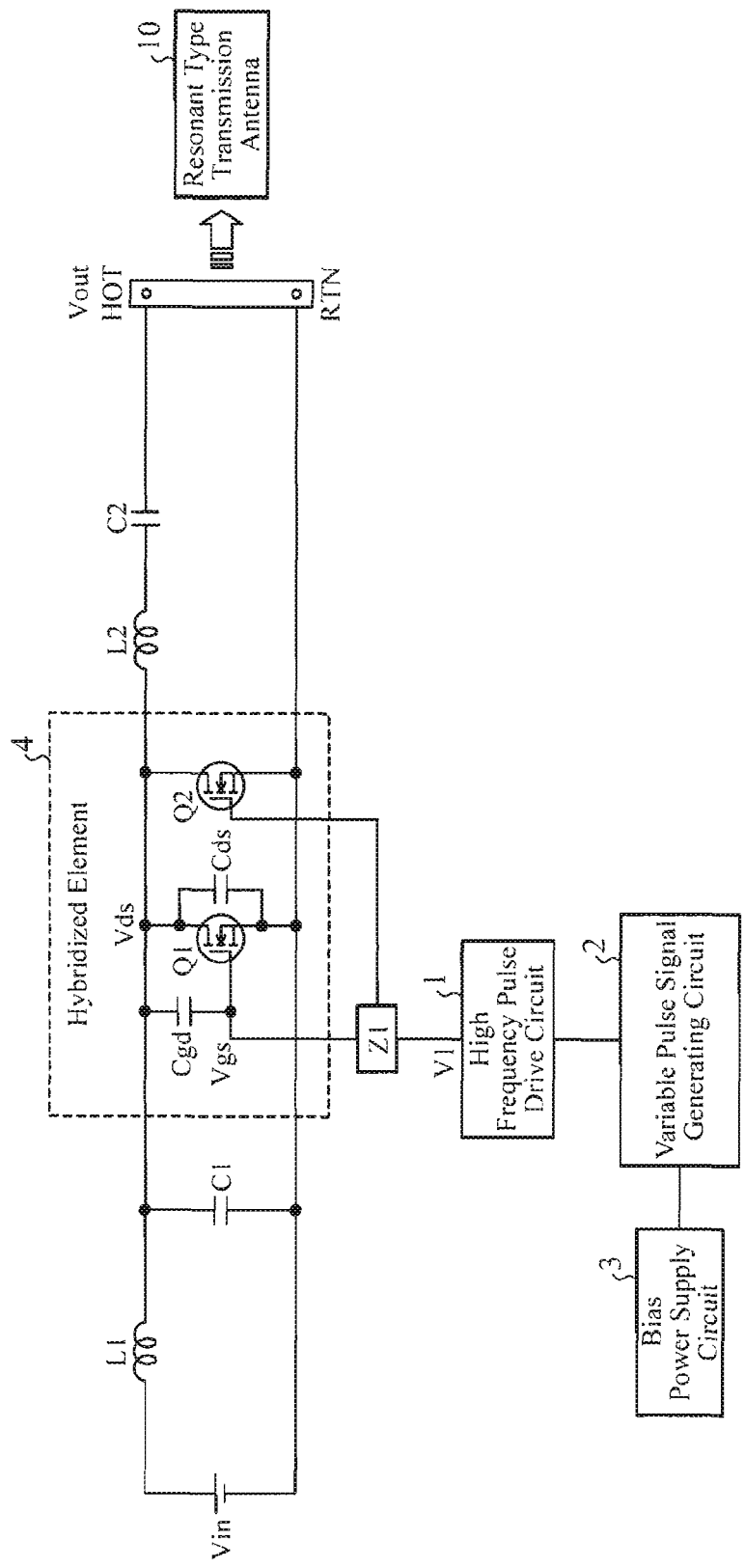
FIG. 3 is a diagram showing another example of the configuration of the resonant type high frequency power supply device in accordance with Embodiment 1 of the present invention (in a case in which a hybridized element is used)
Figure 4:
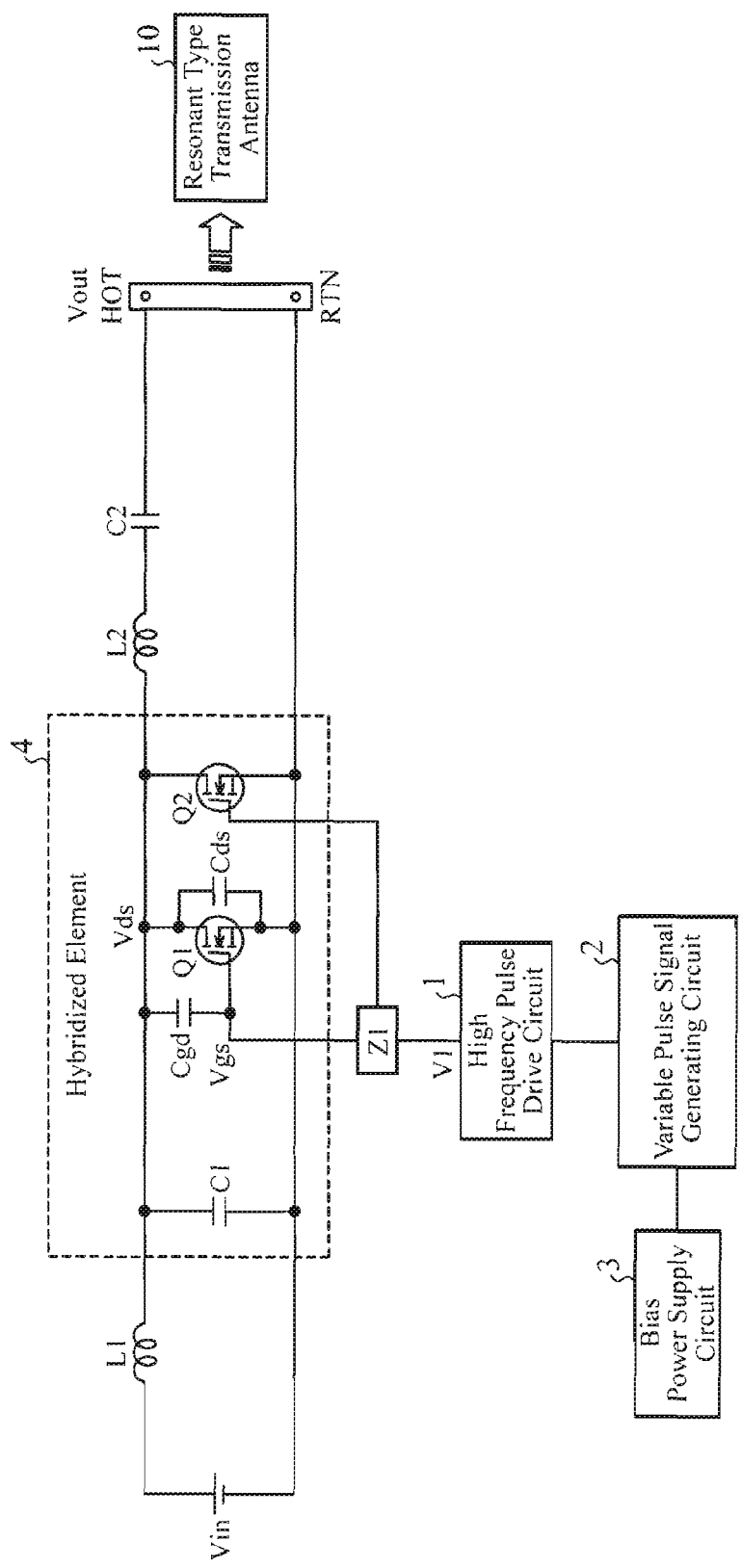
FIG. 4 is a diagram showing another example of the configuration of the resonant type high frequency power supply device in accordance with Embodiment 1 of the present invention (in a case in which a hybridized element is used)
Figure 5:
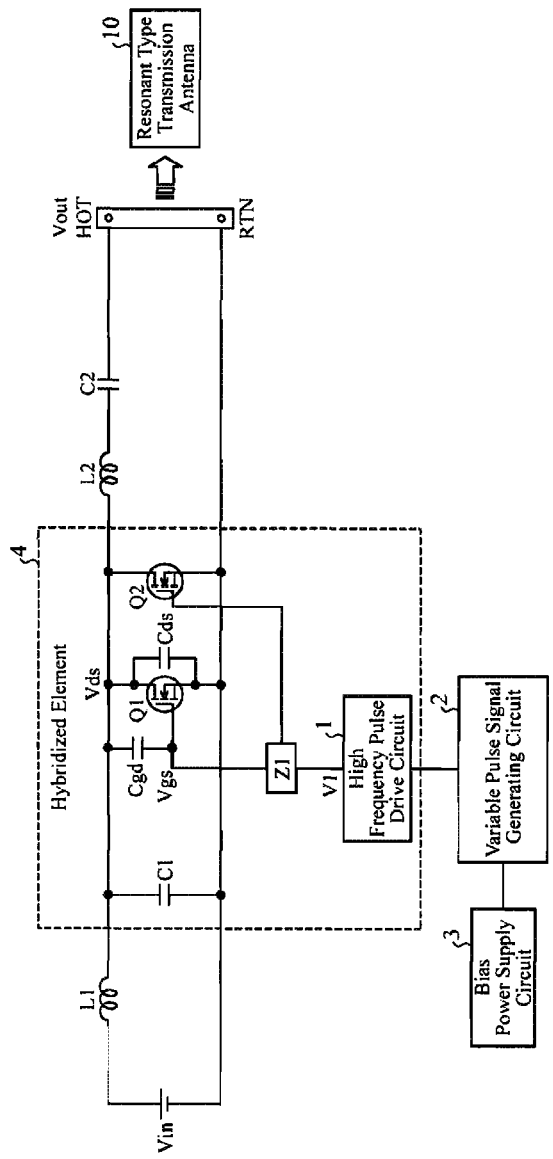
FIG. 5 is a diagram showing another example of the configuration of the resonant type high frequency power supply device in accordance with Embodiment 1 of the present invention (in a case in which a hybridized element is used)
Figure 6:
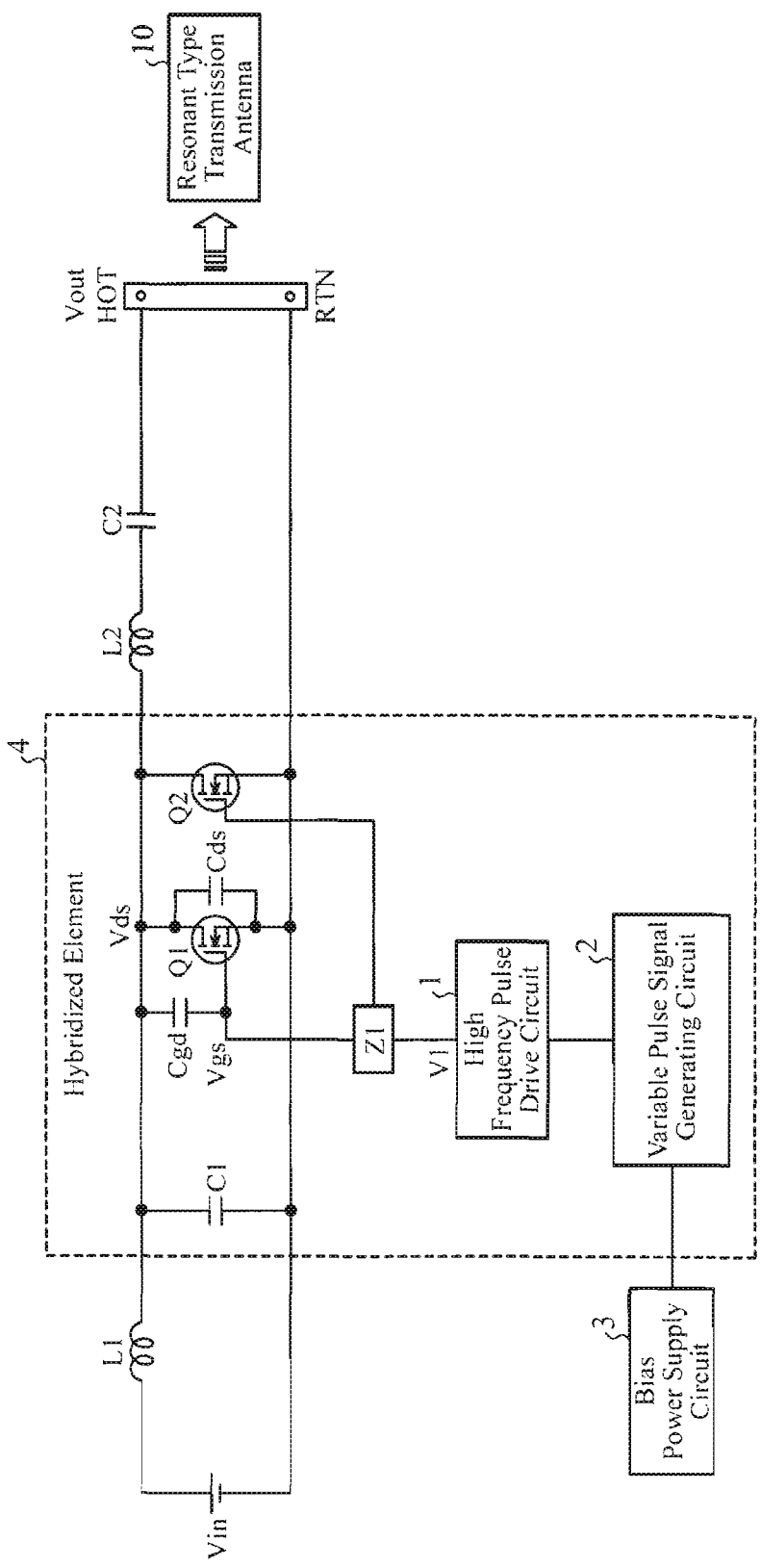
FIG. 6 is a diagram showing another example of the configuration of the resonant type high frequency power supply device in accordance with Embodiment 1 of the present invention (in a case in which a hybridized element is used)
Figure 7:
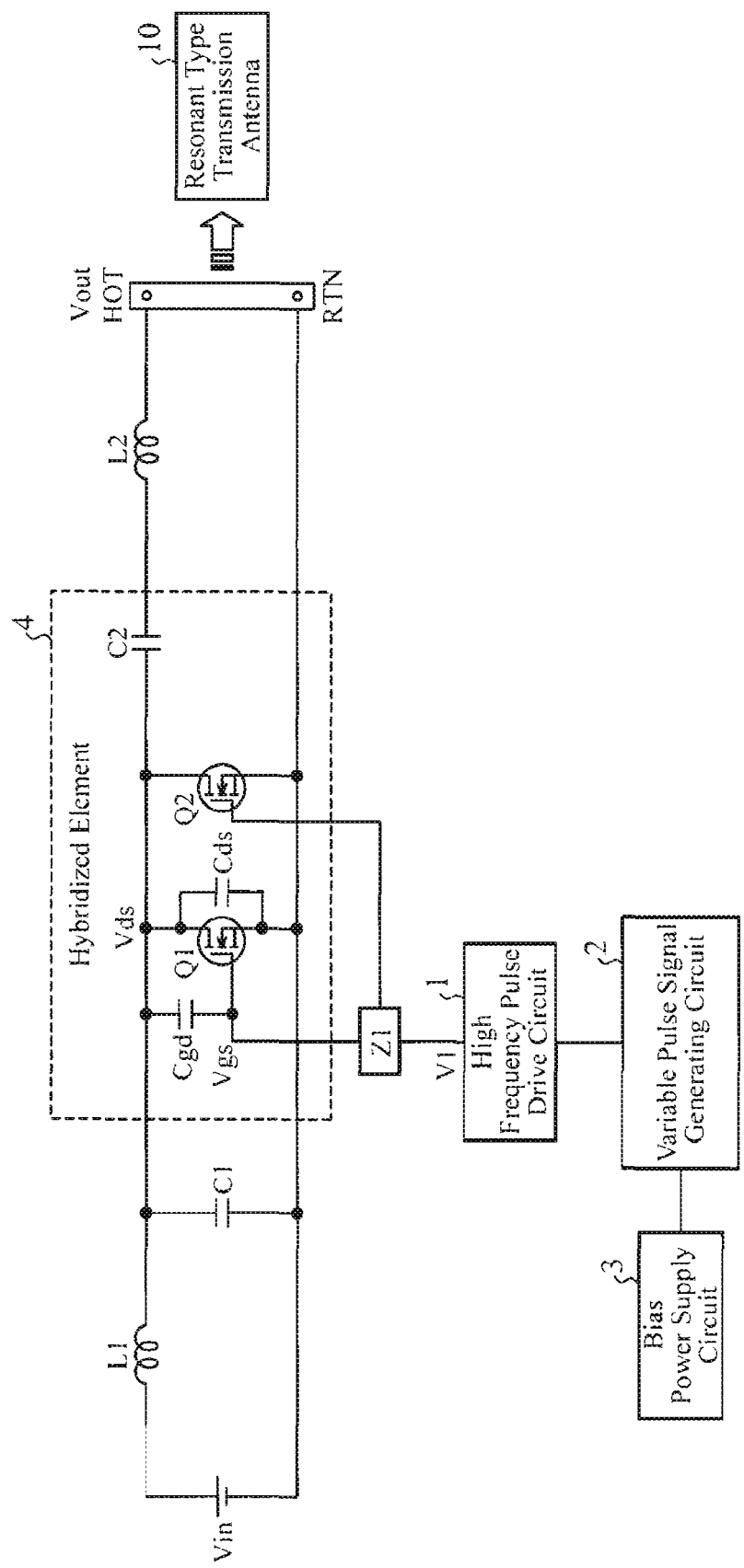
FIG. 7 is a diagram showing another example of the configuration of the resonant type high frequency power supply device in accordance with Embodiment 1 of the present invention (in a case in which a hybridized element is used)
Figure 8:
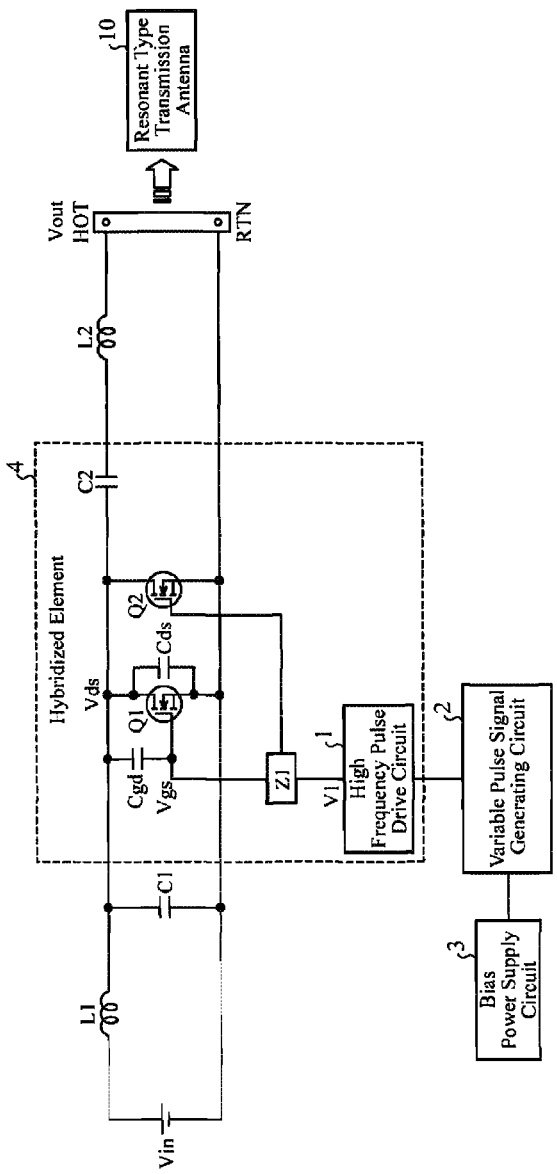
FIG. 8 is a diagram showing another example of the configuration of the resonant type high frequency power supply device in accordance with Embodiment 1 of the present invention (in a case in which a hybridized element is used)
Figure 9:
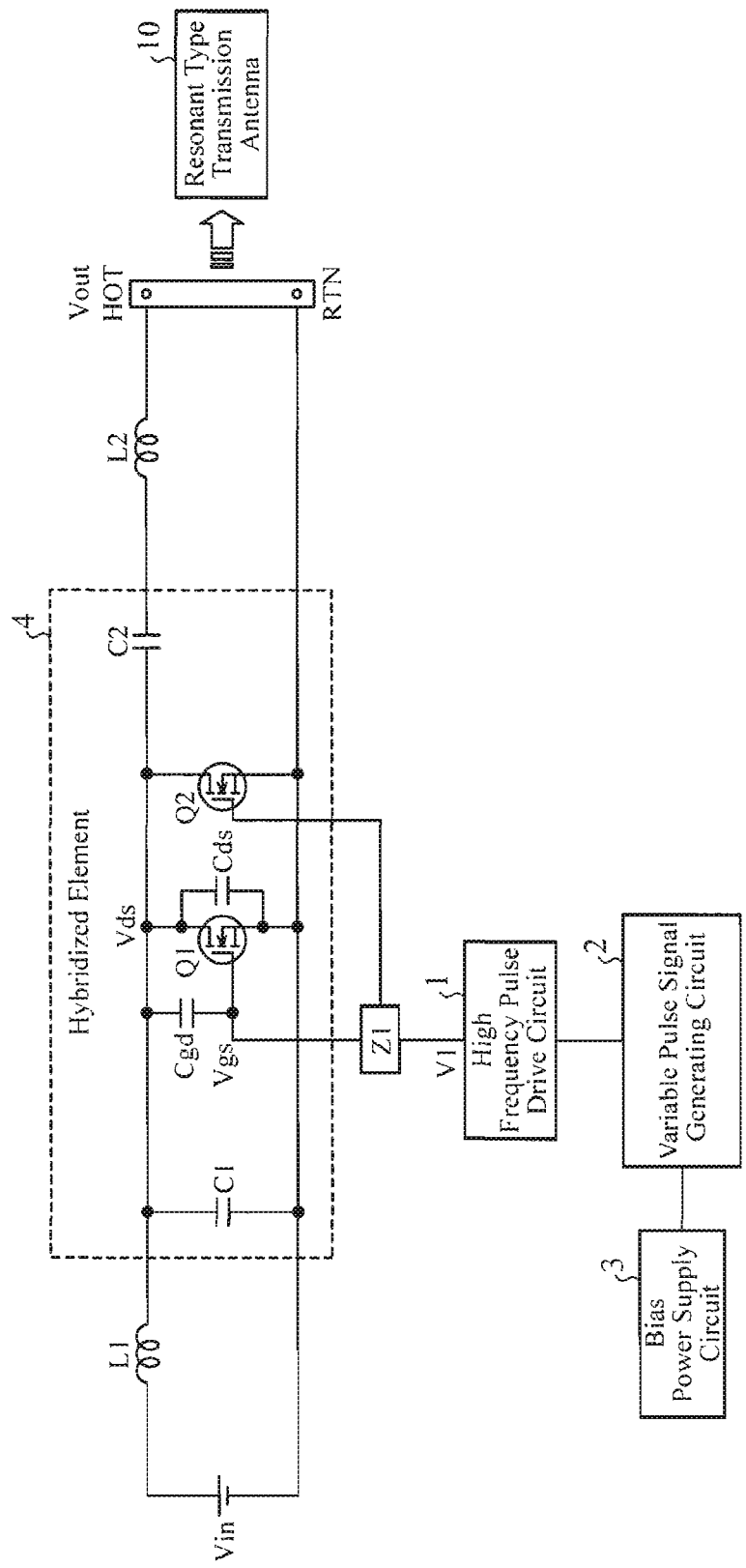
FIG. 9 is a diagram showing another example of the configuration of the resonant type high frequency power supply device in accordance with Embodiment 1 of the present invention (in a case in which a hybridized element is used)
Figure 10:
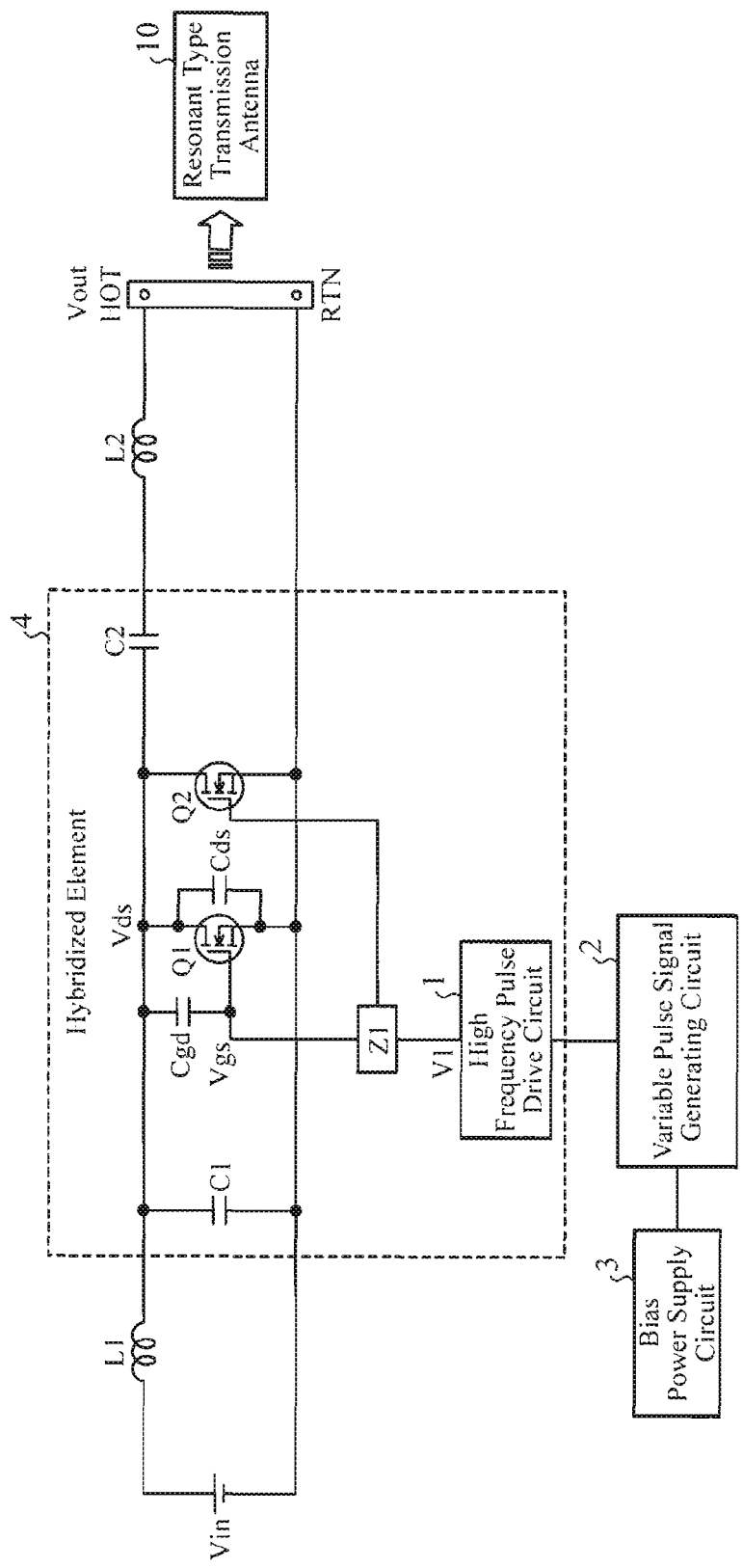
FIG. 10 is a diagram showing another example of the configuration of the resonant type high frequency power supply device in accordance with Embodiment 1 of the present invention (in a case in which a hybridized element is used)
Figure 11:
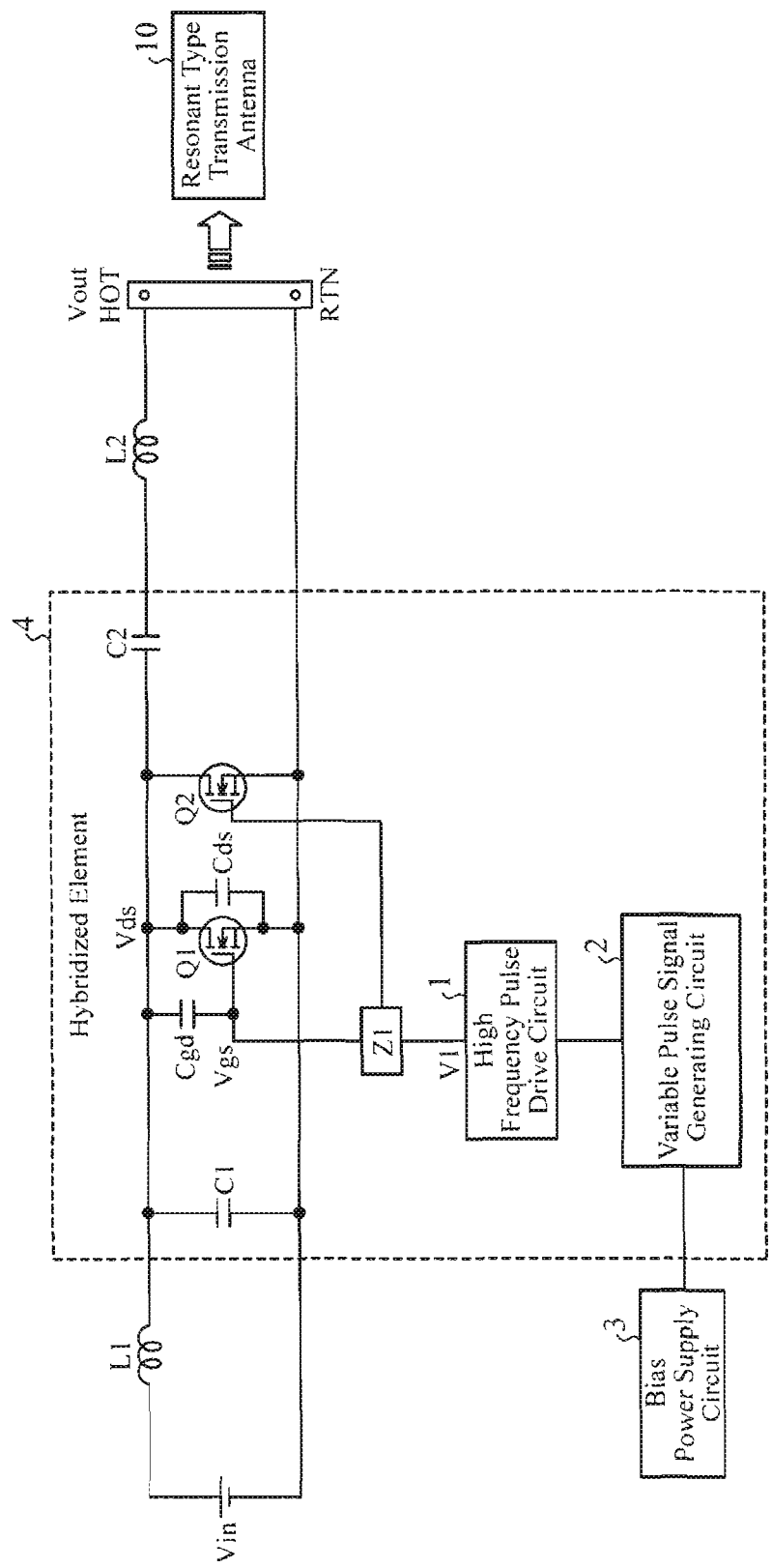
FIG. 11 is a diagram showing another example of the configuration of the resonant type high frequency power supply device in accordance with Embodiment 1 of the present invention (in a case in which a hybridized element is used)

In the example shown in FIG. 1, an element (a switching circuit for the resonant type high frequency power supply device) 4 in which some components are hybridized can be used. FIG. 3 shows an element 4 in which the power semiconductor elements Q1 and Q2 (and which may also include the impedance Z1) are hybridized, FIG. 4 shows an element 4 in which the power semiconductor element Q1, the power semiconductor element Q2 and the capacitor C1 (and which may also include the impedance Z1) are hybridized, FIG. 5 shows an element 4 in which the power semiconductor element Q1, the power semiconductor element Q2, the impedance Z1, the capacitor C1 and the high frequency pulse drive circuit 1 are hybridized, FIG. 6 shows an element 4 in which the power semiconductor element Q1, the power semiconductor element Q2, the impedance Z1, the capacitor C1, the high frequency pulse drive circuit 1 and the variable pulse signal generating circuit 2 are hybridized, FIG. 7 shows an element 4 in which the power semiconductor element Q1, the power semiconductor element Q2, and the capacitor C2 (and which may also include the impedance Z1) are hybridized, FIG. 8 shows an element 4 in which the power semiconductor element Q1, the power semiconductor element Q2, the impedance Z1 the capacitor C2 and the high frequency pulse drive circuit 1 are hybridized, FIG. 9 shows an element 4 in which the power semiconductor element Q1, the power semiconductor element Q2 and the capacitors C1 and C2 (and which may also include the impedance Z1) are hybridized, FIG. 10 shows an element 4 in which the power semiconductor element Q1, the power semiconductor element Q2, the impedance Z1, the capacitors C1 and C2 and the high frequency pulse drive circuit 1 are hybridized, and FIG. 11 shows an element 4 in which the power semiconductor element Q1, the power semiconductor element Q2, the impedance Z1, the capacitors C1 and C2, the high frequency pulse drive circuit 1 and the variable pulse signal generating circuit 2 are hybridized.

Figure 12:
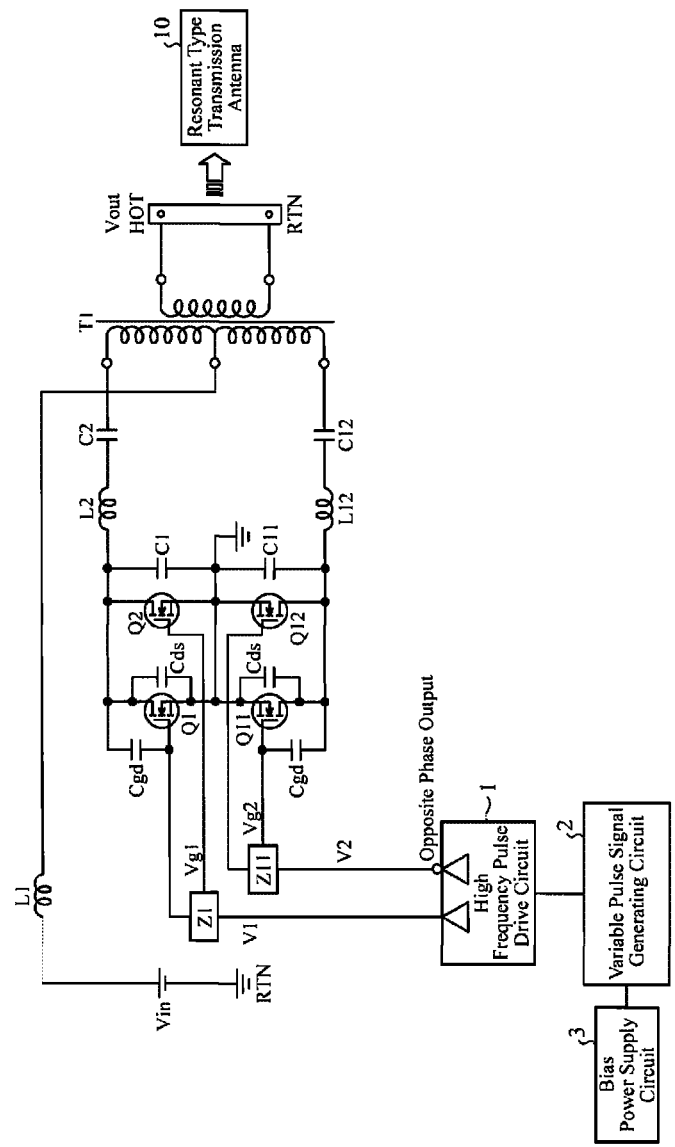
FIG. 12 is a diagram showing another example of the configuration of the resonant type high frequency power supply device in accordance with Embodiment 1 of the present invention (in a case in which the power semiconductor elements have a push-pull configuration)

Further, although the circuit in the case in which the power semiconductor element Q1 has a single configuration is shown in FIG. 1, this embodiment is not limited to this example. For example, as shown in FIG. 12, the present invention can be similarly applied to a case in which the power semiconductor elements Q1 and Q2 have a push-pull configuration.

Figure 13:
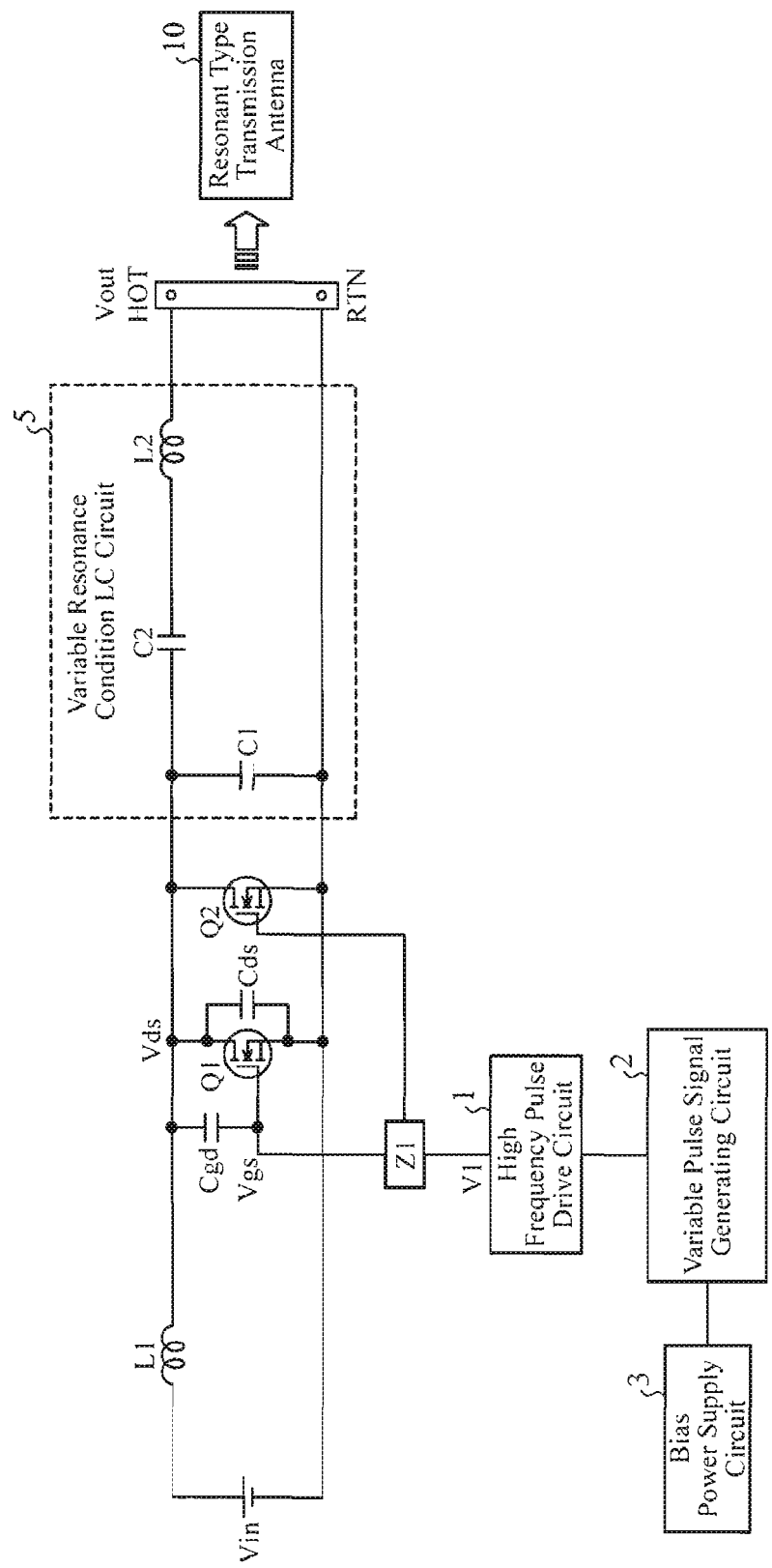
FIG. 13 is a diagram showing another example of the configuration of the resonant type high frequency power supply device in accordance with Embodiment 1 of the present invention (in a case in which a variable resonance condition LC circuit is disposed)
Figure 14:
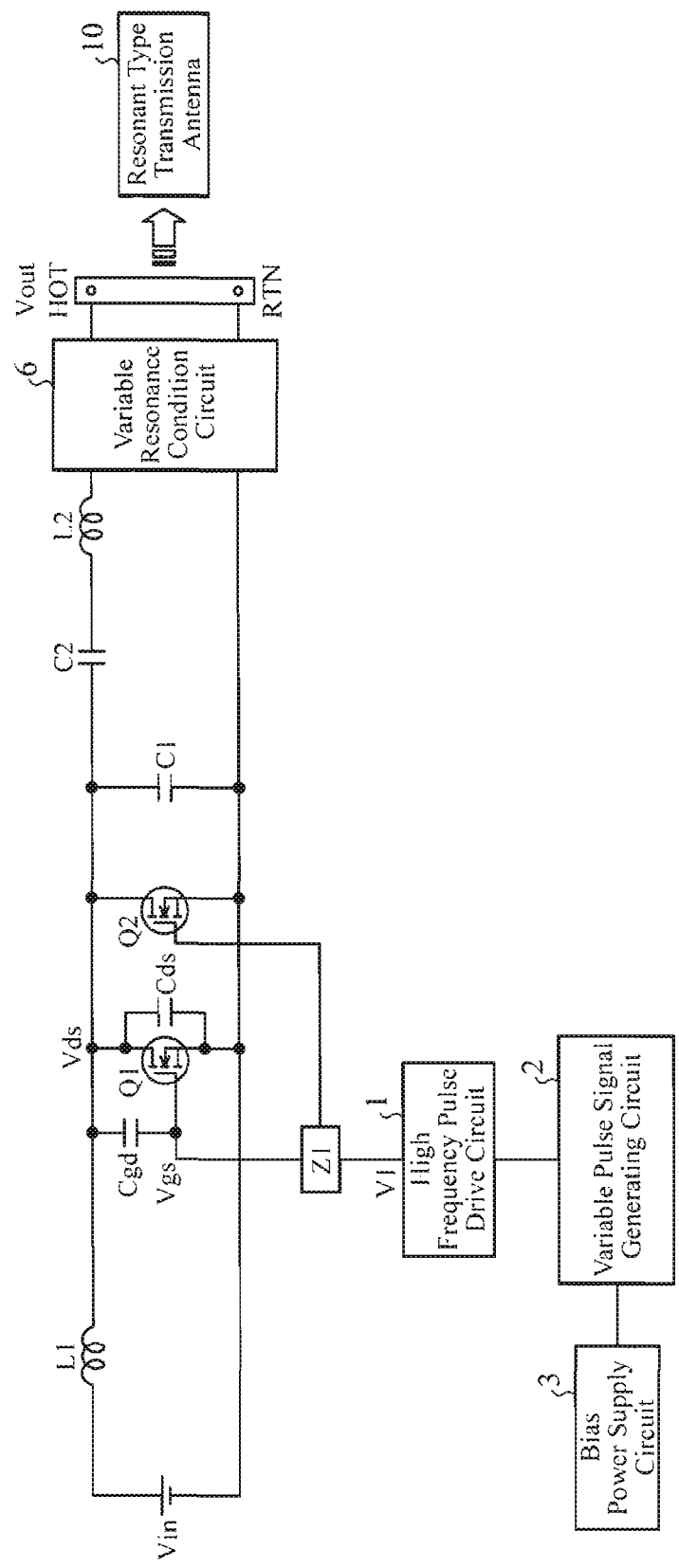
FIG. 14 is a diagram showing another example of the configuration of the resonant type high frequency power supply device in accordance with Embodiment 1 of the present invention (in a case in which a variable resonance condition circuit is disposed)

Further, although the explanation about FIG. 1 is made by assuming that the constants of the resonance circuit elements the capacitors C1 and C2 and the inductor L2) are fixed and hence the resonance condition is fixed, this embodiment is not limited to this example. For example, as shown in FIG. 13, a variable resonance condition circuit 5 that causes the resonance condition to be variable can be alternatively used. Further, for example, as shown in FIG. 14, a variable resonance condition circuit 6 that causes the resonance condition according to the above-mentioned resonance circuit elements (the capacitors C1 and C2 and the inductor L2) to be variable can be disposed separately.

Embodiment 2

Figure 15:
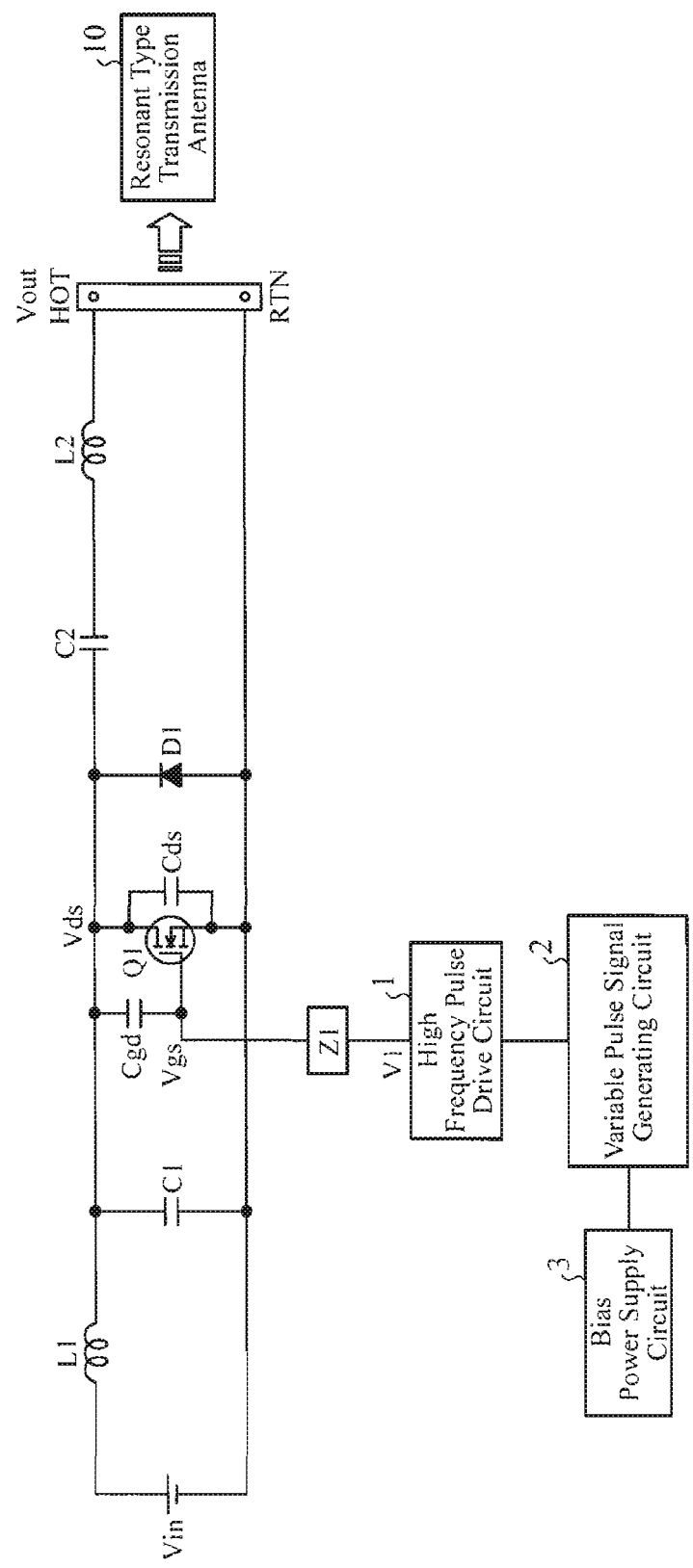
FIG. 15 is a diagram showing the configuration of a resonant type high frequency power supply device in accordance with Embodiment 2 of the present invention (in a case in which a power semiconductor element has a single configuration)
Figure 16:
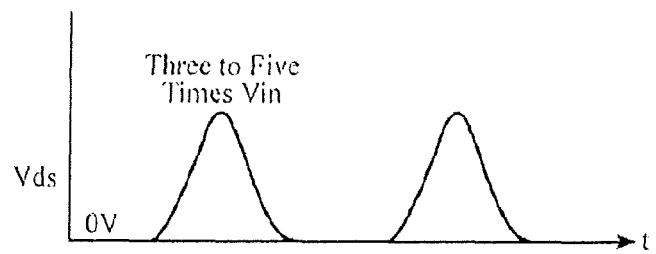
FIG. 16 is a diagram showing a Vds waveform according to the resonant type high frequency power supply device in accordance with Embodiment 2 of the present invention.
Figure 17:
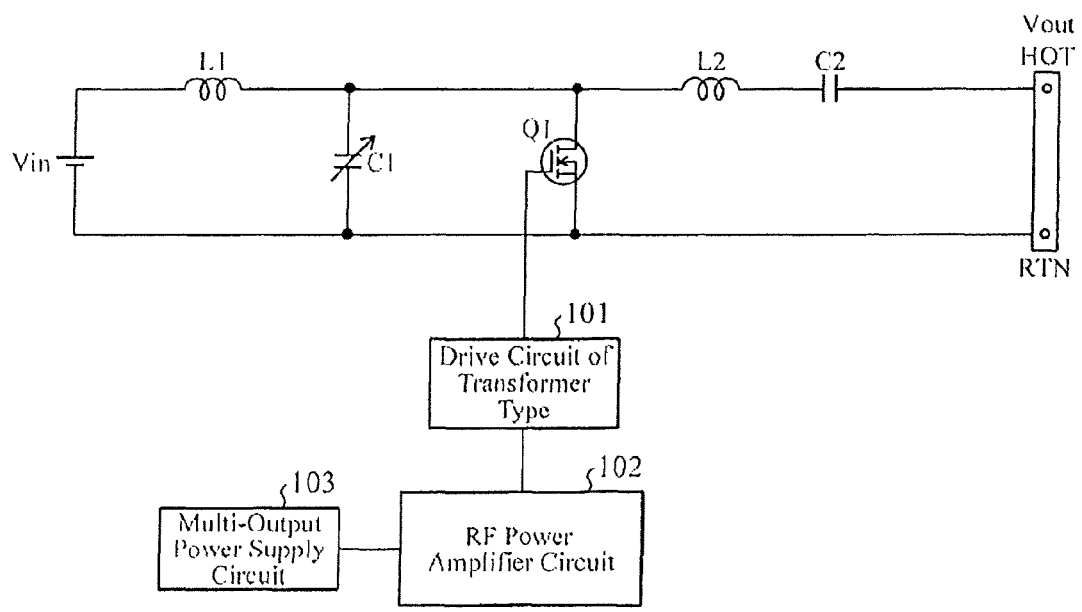
FIG. 17 is a diagram showing the configuration of a conventional resonant type high frequency power supply device.

Although the case in which at least one power semiconductor element Q2 or more is connected in parallel to the power semiconductor element Q1 is shown in the above-mentioned Embodiment 1, it is not limited to this example. For example, as shown in FIG. 15, it may be configured to comprise at least one diode D1 or more connected in parallel to the power semiconductor element Q1 to achieve optimization of the parasitic capacitances (Cds+Cgd) of the power semiconductor element Q1 and the diode D1 itself, to thereby obtain a similar advantageous effect. A Vds waveform in this case is the one as shown in FIG. 16. Note that elements such that a maximum value of a resonance voltage of Vds is three to five times the direct voltage Vin are selected for the power semiconductor element Q1 and the diode D1. Further, the optimization for that selection is achieved from the parasitic capacitances (Cds+Cgd) of the power semiconductor element Q1, the parasitic capacitance of the diode D1 and a falling time of Vgs.

In addition, in a case where a Schottky barrier diode is used for the diode D1, power consumption can be further reduced. Additionally, hybridizations of the above elements in the case using the diode D1 can be constituted in manners similar to those of FIGS. 3 to 11.

Further, although there are shown the case in which at least one power semiconductor element Q2 or more is connected in parallel to the power semiconductor element Q1 in Embodiment 1, and the case in which at least one diode D1 or more is connected in parallel to the power semiconductor element Q1 in Embodiment 2, these cases may be combined with each other.

Further, while the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The resonant type high frequency power supply device and the switching circuit for the resonant type high frequency power supply device in accordance with the present invention achieve high efficiency with low power consumption by adjusting the timing of the resonant switching of the power semiconductor element without using a capacitor, and can operate at a high frequency exceeding 2 MHz. Therefore, the resonant type high frequency power supply device and the switching circuit for the resonant type high frequency power supply device are suitable for use as a resonant type high frequency power supply device and a switching circuit for the resonant type high frequency power supply device that perform power transmission at a high frequency, etc.

EXPLANATIONS OF REFERENCE NUMERALS 1 high frequency pulse drive circuit, 2 variable pulse signal generating circuit, 3 bias power supply circuit, 4 hybridized element (switching circuit for resonant type high frequency power supply device), 5 variable resonance condition LC circuit, 6 variable resonance condition circuit, and 10 resonant type transmission antenna (transmission antenna for power transmission).

The invention claimed is:

1. A resonant type high frequency power supply device comprising:
   a first power semiconductor element that performs a switching operation to convert a direct voltage to a high frequency alternating voltage;
   a second power semiconductor element connected in parallel to said first power semiconductor element, said second power element having a parasitic capacitance; and
   a high frequency pulse drive circuit that drives said first power semiconductor element and said second power semiconductor element by applying a pulse-shaped voltage,
   wherein a peak value of a resonant voltage at a drain terminal of said first power semiconductor element is 3 to 5 times a value of said direct voltage due to said parasitic capacitance of said second power semiconductor element.

2. The resonant type high frequency power supply device according to claim 1, further comprising at least one diode or more connected in parallel to said first power semiconductor element.

3. The resonant type high frequency power supply device according to claim 1, wherein said first power semiconductor element is a Si-MOSFET, a SiC-MOSFET or a GaN-FET.

4. The resonant type high frequency power supply device according to claim 1, wherein said first and second power semiconductor elements have a push-pull type configuration or a single type configuration.

5. The resonant type high frequency power supply device according to claim 1, further comprising a variable impedance matching circuit that includes a variable capacitor and a variable inductor.

6. A switching circuit for a resonant type high frequency power supply device, said switching circuit comprising:
   a first power semiconductor element that performs a switching operation to convert a direct voltage to a high frequency alternating voltage;
   a second power semiconductor element connected in parallel to said first power semiconductor element, said second power semiconductor element having a parasitic capacitance; and
   a high frequency pulse drive circuit that drives said first power semiconductor element and said second power semiconductor element by applying a pulse-shaped voltage,
   wherein a peak value of a resonant voltage at a drain terminal of said first power semiconductor element is 3 to 5 times a value of said direct voltage due to said parasitic capacitance of said second power semiconductor element.

7. The switching circuit according to claim 6, further comprising:
   a signal line connecting said high frequency drive circuit to a gate terminal of said first power semiconductor element, and
   said peak value of said resonant voltage at said drain terminal of said first power semiconductor element is 3 to 5 times said value of said direct voltage further due to an impedance of said signal line.

8. The switching circuit device according to claim 6, wherein said peak value of said resonant voltage at said drain terminal of said first power semiconductor element is 3 to 5 times said value of said direct voltage due to parasitic capacitance of said first power semiconductor element that includes a gate to drain parasitic capacitance.

9. The switching circuit according to claim 8, wherein said peak value of said resonant voltage at said drain terminal of said first power semiconductor element is 3 to 5 times said value of said direct voltage due to said parasitic capacitance of said first power semiconductor element that further includes a drain to source parasitic capacitance.

10. A resonant type high frequency power supply device comprising:
   a first power semiconductor element that performs a switching operation to convert a direct voltage to a high frequency alternating voltage;
   a second power semiconductor element connected in parallel to said first power semiconductor element, said second power semiconductor element having a parasitic capacitance; and
   a high frequency drive circuit that drives said first power semiconductor element and said second power semiconductor element by applying a voltage, wherein a peak value of a resonant voltage at a drain terminal of said first power semiconductor element is 3 to 5 times a value of said direct voltage due to said parasitic capacitance of said second power semiconductor element.

11. The resonant type high frequency power supply device according to claim 10, further comprising:
a signal line connecting said high frequency drive circuit to a gate terminal of said first power semiconductor element, and
said peak value of said resonant voltage at said drain terminal of said first power semiconductor element is 3 to 5 times said value of said direct voltage further due to an impedance of said signal line.

12. The resonant type high frequency power supply device according to claim 10, wherein said peak value of said resonant voltage at said drain terminal of said first power semiconductor element is 3 to 5 times said value of said direct voltage due to parasitic capacitance of said first power semiconductor element that includes a gate to drain parasitic capacitance.

13. The resonant type high frequency power supply device according to claim 12, wherein said peak value of said resonant voltage at said drain terminal of said first power semiconductor element is 3 to 5 times said value of said direct voltage due to said parasitic capacitance of said first power semiconductor element that further includes a drain to source parasitic capacitance.

14. The resonant type high frequency power supply device according to claim 1, further comprising:
a signal line connecting said high frequency pulse drive circuit to a gate terminal of said first power semiconductor element, and
said peak value of said resonant voltage at said drain terminal of said first power semiconductor element is 3 to 5 times said value of said direct voltage further due to an impedance of said signal line.

15. The resonant type high frequency power supply device according to claim 1, wherein said peak value of said resonant voltage at said drain terminal of said first power semiconductor element is 3 to 5 times said value of said direct voltage due to parasitic capacitance of said first power semiconductor element that includes a gate to drain parasitic capacitance.

16. The resonant type high frequency power supply device according to claim 15, wherein said peak value of said resonant voltage at said drain terminal of said first power semiconductor element is 3 to 5 times said value of said direct voltage due to said parasitic capacitance of said first power semiconductor element that further includes a drain to source parasitic capacitance.

* * * * *